United States Patent [19]

Hille

[11] 4,208,754
[45] Jun. 24, 1980

[54] CLEANING APPARATUS FOR CONVEYOR ROLLS

[75] Inventor: Earl A. Hille, Elmore, Ohio

[73] Assignee: Libbey-Owens-Ford Company, Toledo, Ohio

[21] Appl. No.: 46,105

[22] Filed: Jun. 6, 1979

[51] Int. Cl.$^2$ ............................................. A46B 13/02
[52] U.S. Cl. ...................................... 15/88; 15/21 E; 51/49
[58] Field of Search ............ 15/21 D, 21 E, 88, 97 R, 15/104.04; 51/49; 65/168

[56] References Cited

U.S. PATENT DOCUMENTS

| | | | |
|---|---|---|---|
| 2,751,617 | 6/1956 | McLaggan | 15/88 |
| 3,457,576 | 7/1969 | Yarrow | 15/88 |
| 3,999,239 | 12/1976 | Misuna | 15/88 |
| 4,165,549 | 8/1979 | Wennerstrom et al. | 15/88 |

Primary Examiner—Edward L. Roberts
Attorney, Agent, or Firm—Collins, Oberlin & Darr

[57] ABSTRACT

Apparatus for removing uneven and crusty deposits from, and burnishing the surfaces of, conveyor rolls employed in the manufacture of flat glass. The apparatus includes a lower main unit comprising an elongated main frame having a pair of roll supporting stations for rotatably supporting at least one conveyor roll, and for supporting an upper removable surface cleaning or brushing unit comprising a frame slidably supporting a reciprocating carriage upon which is mounted a rotating annular brush for engaging the surface of the conveyor roll. The lower unit is provided with a series of burners for maintaining the temperature of the conveyor roll at a level sufficient to facilitate removal of encrustations thereon and to permit the roll to be reinstalled in a lehr immediately after being cleaned without the usual preheating.

10 Claims, 5 Drawing Figures

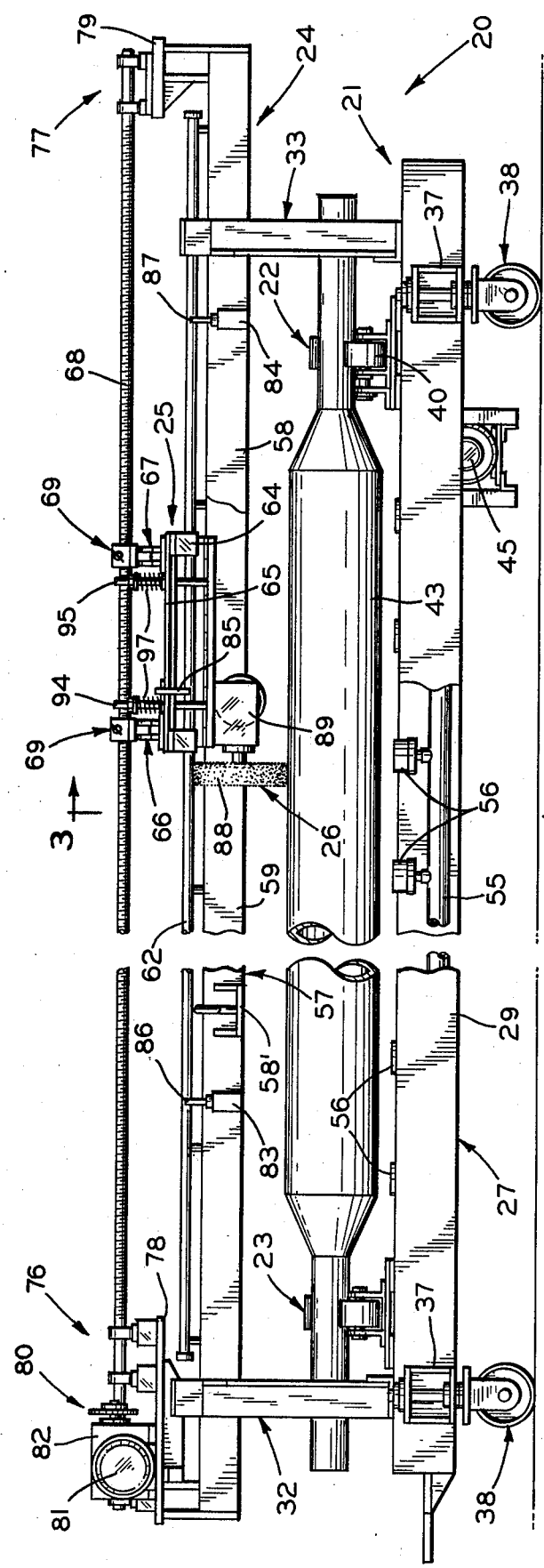
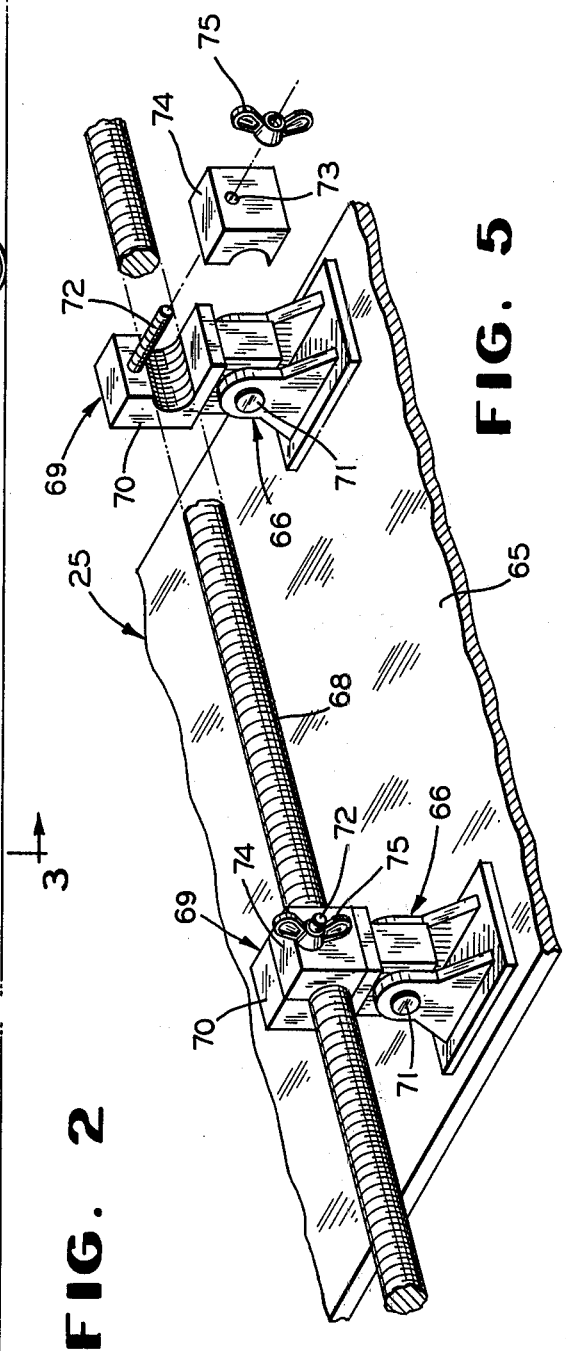
FIG. 2
FIG. 5

CLEANING APPARATUS FOR CONVEYOR ROLLS

BACKGROUND OF THE INVENTION

1. Field of the Invention

This invention generally relates to the quality of flat glass produced from a molten glass mass and, more particularly, to a cleaning apparatus for removing uneven and crusty deposits from the surfaces of conveying rolls.

2. Description of the Prior Art

In the production of flat glass, it is customary to produce a continuous ribbon of glass from a molten glass mass and convey this newly formed ribbon through an annealing lehr. One of the primary purposes of conveying the newly formed glass ribbon through the lehr is to cool the ribbon from the hot plastic condition in which it emerges from the forming area to a rigid glass ribbon at approximately ambient temperature while producing a controlled permanent stress pattern therein. In a conventional annealing process, temperatures in the lehr may range from about 1300° F. (704.4° C.) at its entrance end to about 400° F. (204.4° C.) or less at its exit end. The newly formed glass ribbon is in a softened plastic condition, and it remains in this condition as it enters the entrance end of the annealing lehr. Consequently, the newly formed glass ribbon is subject to a defect known in the art as "roll print". Roll print, characterized by broad band distortion such as random surface rub marks, fissures and in some cases even fractures, is caused by mechanical contact of the softened, plastic glass ribbon with the conveyor rolls. The rolls may have uneven and crusty deposits on their surfaces which imprint on the soft undersurface of the newly formed glass ribbon.

In the case of annealing lehr conveyor rolls, especially those rolls adjacent the entrance to the lehr, the uneven and crusty deposits are thought to be formed on the surfaces thereof by the carryover of vapors from the glass forming process which condense and deposit themselves on the rolls as a crusty layer of nonuniform thickness, as well as by the carryover and transfer of foreign matter adhering on the soft undersurface of the glass ribbon.

Cleaning apparatus such as that disclosed in assignee's U.S. Pat. No. 4,042,364, issued on Aug. 16, 1977, has been used successfully to remove impacted crusty deposits from the surfaces of moderately encrusted conveyor rolls. However, such cleaning apparatus must be of heavy construction to provide the brushing forces required to remove deposits from heavily encrusted conveyor rolls. Since the available working space within a lehr is minimal, i.e. the space between the lehr rolls and the floor is of a very limited height, use of such an apparatus may not be feasible in all circumstances. Accordingly, it is desirable to provide a simple, efficient off-line roll cleaning apparatus for those rolls requiring greater cleaning effort.

SUMMARY OF THE INVENTION

Generally speaking, the present invention overcomes the aforementioned problems by utilizing a mobile two-unit apparatus operable outside of and positionable along the length of the lehr. The cleaning apparatus generally comprises a mobile lower main unit having a pair of rotating roll supporting stations, one at either of its ends, and an upper removable unit which includes a longitudinally reciprocal, rotary brushing wheel. The roll supporting stations each include a large diameter center wheel flanked on either of its sides by smaller diameter idler wheels. The wheels of each station rotatably support a trunnion section at each end of the elongated conveyor roll which is being cleaned. The roll supporting stations are adapted to store a second conveyor roll, one either awaiting cleaning or a cleaned roll awaiting reinstallation in the annealing lehr. Further, the lower main unit may include heater devices for heating the roll while it is being cleaned in order to maintain its temperature so that the surface encrustations can better be removed and/or it can be reinstalled in an operating lehr immediately after being cleaned without the usual preheating step.

OBJECTS AND ADVANTAGES

An object of this invention is to provide a cleaning and burnishing apparatus for restoring the conveyor rolls employed in the production of flat glass to substantially their original condition.

Another object of this invention is to provide a cleaning apparatus that is simple in construction, easily used, and which reduces the time required for cleaning the roll.

Yet another object of this invention is to provide a cleaning and burnishing apparatus for cleaning the supporting surface of conveying rolls wherein the roll is maintained at an elevated temperature to facilitate removal of the encrustations thereon and permit quicker reinstallation of the roll in an operating lehr.

Other objects and advantages will become more apparent during the course of the following description when taken in connection with the accompanying drawings.

BRIEF DESCRIPTION OF THE DRAWINGS

In the drawings, wherein like numerals are employed to designate like parts throughout the same:

FIG. 2 is a side elevational view of the assembled cleaning apparatus shown in FIG. 1;

FIG. 5 is an enlarged fragmentary perspective view of the rotary drive screw and the mounting arrangement for manually positioning the carriage thereon along and above the roll.

DESCRIPTION OF THE PREFERRED EMBODIMENT

Figure 1:
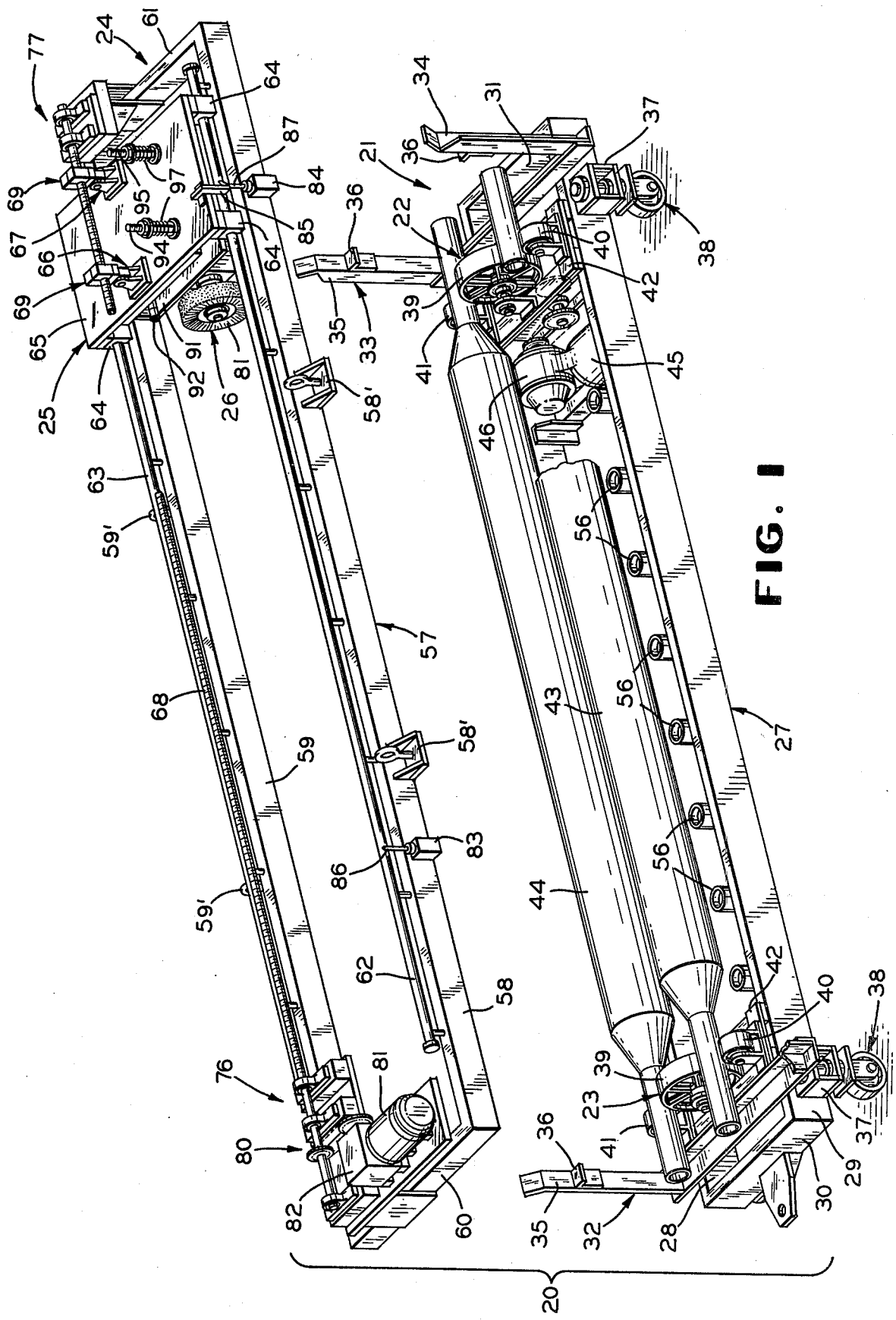
FIG. 1 is an exploded perspective view of the roll cleaning apparatus constructed in accordance with the invention.

Briefly, the cleaning and burnishing apparatus constructed in accordance with the invention includes a mobile lower main unit having roll supporting stations for rotatably supporting a conveyor roll and an upper removable unit which slidably supports a rotary driven brush cleaning device. More specifically, and as illustrated in FIGS. 1 and 2, the novel device includes a roll cleaning apparatus generally designated in its entirety by the reference numeral 20 for cleaning and burnishing horizontally disposed conveying rolls which are conventionally employed in advancing a glass ribbon through an annealing lehr (not shown). The roll cleaning apparatus 20 is particularly adapted for cleaning lehr rolls immediately upon their removal from the lehr. The apparatus 20 generally comprises a mobile main supporting unit 21 having a pair of rotary roll supporting stations 22 and 23 and a removable upper unit 24 for slidably supporting a carriage 25 carrying a rotary annular cleaning device 26.

As best illustrated in FIG. 1, the main supporting unit 21 is a weldment structure carrying the roll supporting stations 22 and 23. More specifically, the weldment structure comprises an elongated rectangular base frame 27 having side members 28 and 29 joined at their ends by transverse structural members 30 and 31, and upright U-shaped supporting members 32 and 33 offset to one side of the base frame 27 (see FIG. 3). The U-shaped members 32 and 33 are affixed to the frame 27 adjacent the ends thereof and outwardly of the roll stations 22 and 23. The legs 34 and 35 of each U-shaped member 32 and 33 are provided with inwardly projecting brackets 36 for supporting the upper, removable unit 24 in spaced relationship to the roll supporting stations 22 and 23. The side members 28 and 29 of the base frame 27 are provided with outrigger brackets 37 mounting casters 38 for moving and positioning the cleaning apparatus 20 along a lehr (not shown).

Figure 3:
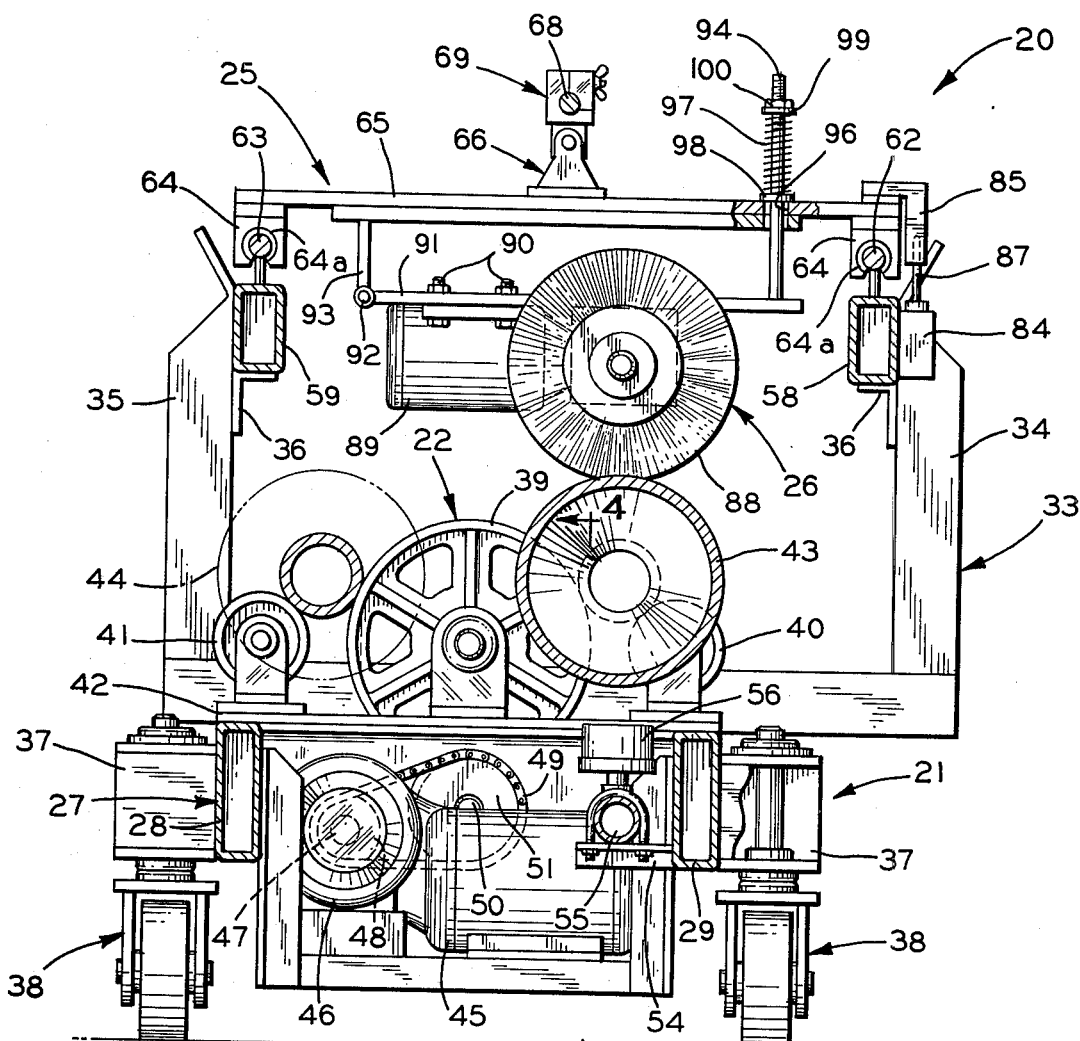
FIG. 3 is an enlarged cross-sectional view taken substantially along 3—3 of FIG. 2 illustrating the roll rotating drive mechanism.

Referring now to FIGS. 1 and 3, each roll supporting station 22 and 23 generally comprises a center wheel 39 with smaller size idler wheels 40 and 41 flanking either side thereof and in spaced relationship thereto, the wheels being rotatably supported on a base 42 affixed to the frame 27 adjacent the upright supporting frames 32 and 33. These wheels rotatably support the trunnion sections of one conveyor roll 43 which is being cleaned, while a second roll 44 may be stored awaiting cleaning or reinstallation in the lehr. It will be appreciated, of course, that while such rolls are at elevated temperatures such as those at which they operate within the lehr, or are being heated to or cooled from operating temperature, they must be continuously rotated about their longitudinal axes to avoid sagging or warping.

Figure 4:
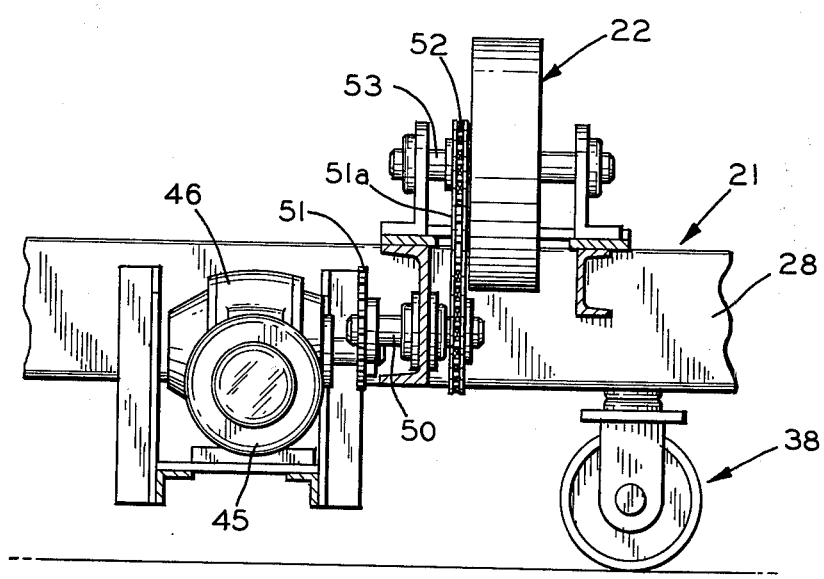
FIG. 4 is an enlarged fragmentary view taken substantially along line 4—4 of FIG. 3.

Referring now to FIGS. 3 and 4, the center wheel 39 of the supporting station 22 is rotatably driven for frictionally rotating the conveyor rolls 43 and 44 which are being cleaned and stored, respectively. As there illustrated, a drive motor 45 drives a gear unit 46 having an output shaft 47 to which a sprocket wheel 48 is affixed for rotation therewith. A chain 49 driven thereby rotatably drives a shaft 50 to which is affixed a drive sprocket wheel 51 which rotatably drives, by means of a chain 51a, a driven sprocket wheel 52 affixed to a shaft 53 which rotates the wheel 39 affixed thereto.

As best illustrated in FIGS. 1, 2 and 3, the base frame 27 is provided with brackets 54 which support an elongated manifold pipe 55 to which is affixed a plurality of burners 56. The burners are located beneath and directed upwardly toward the roll 43 so as to maintain the temperature of the rolls 43 and 44 to facilitate the cleaning process and permit storage of a roll to be cleaned or a clean roll while permitting immediate reinstallation in an operating lehr.

Referring now to FIG. 1, the removable upper unit 24 is also a weldment structure generally comprising an elongated rectangular frame 57 having side members 58 and 59 joined at their ends by transverse structural members 60 and 61. The frame 57 is adapted to rest upon the brackets 36 of the U-shaped members 32 and 33 of the main supporting unit 21. The frame 57 also includes a pair of elongated track members or guides 62 and 63 which are affixed to the sides 58 and 59, respectively, of the frame 57 as by welding. The track members 62 and 63 are cylindrical in shape so that shoes 64 affixed to the carriage 25 and having similarly shaped guideways 64a slide (see FIG. 3) so as to restrain and guide the carriage 25 as it reciprocally moves to and fro, along the tracks. A plurality of eye bolts 58' and 59' may be affixed to the sides 58 and 59, respectively, of the frame 57 for facilitating handling of the upper unit 24 during its removal and installation on the main unit 21.

The carriage 25 generally comprises a rectangularly shaped base plate 65 (see FIG. 1) supported by the shoes 64, one shoe depending from each corner of the plate 65, whereby the plate is slidable along the rails 62 and 63. The top of the base plate 65 is provided with a pair of pedestals 66 and 67 (see FIG. 5) for movably attaching the carriage 25 to an elongated drive screw 68 by means of which the carriage is reciprocally moved to and fro along the rails 62 and 63. The pedestals 66 and 67 include means for releasing from, and manually positioning the carriage 25 at selected locations along, the drive screw 68. To this end, as best illustrated in FIG. 5, each pedestal 66 and 67 includes a split nut 69 having a portion 70 pivotally mounted by a pivot pin 71 affixed to the pedestals. The portion 70 includes a threaded stud 72 extending through an aperture 73 provided in a removable nut portion 74. A wing nut 75 threaded on the stud 72 secures the portion 74 to the portion 70 of the nut 69, thus threadably attaching the carriage 25 to the screw 68.

Referring now to FIG. 1, the ends of the elongated drive screw 68 are rotatably journalled in pillow block bearings 76 and 77 mounted on support plates 78 and 79, respectively, affixed to either end of the frame 57 as by welding. The screw 68 is rotatably driven in either direction of rotation by a chain and sprocket arrangement 80 driven by a reversible drive motor 81. A gear unit 82 drivingly connects the motor 81 to the chain and sprocket arrangement 80.

As herein provided, the reciprocable movements of the carriage 25 are controlled by spaced apart limit switches 83 and 84 which are located intermediate the ends of the rail 62. These limit switches are adapted to be engaged by an arm 85 depending from the carriage 25. As shown, the limit switches have arms 86 and 87, respectively, which, when engaged by the carriage arm 85, close the electrical contacts (not shown) thereof. Accordingly, when the carriage reaches the intended terminus of its movement in one direction, for example to the left in FIG. 2, the switch 83 will be actuated to change the polarity and reverse the motor 81 to move the carriage 25 in the opposite direction. As shown in FIG. 1, the switches are similarly mounted on the side 58 of the removable frame 57.

Referring now to FIG. 3, the annular cleaning device 26 generally comprises a wire brush 88 rotatably driven by a motor and gear unit 89 which is suspended from the bottom of the carriage plate 65. More specifically, the motor and gear unit 89 is attached by a plurality of nuts and bolts 90 to a plate 91 which is hingedly connected by a hinge pin 92 to a depending bracket 93 affixed to the carriage plate 65. The side of the hinge plate 91 opposite the hinge connection is provided with a pair of threaded studs 94 and 95 (see FIG. 1) which extend through apertures 96 (only one shown) provided in the carriage plate 65. A compression spring 97, disposed between washers 98 and 99, surrounds each of the studs 94 and 95, and the reaction of the springs 97 may be controlled by adjusting nuts 100 threadably attached to the studs 94 and 95 for regulating the pressure of the brush 88 bearing against the surface of the conveyor roll 43. From the foregoing discussion, it may be seen that the weight of the cleaning apparatus 26 causes the brush 88 to bear against the roll 43 with sufficient force to clean the roll, and that the force can be controlled by manipulating the adjusting nuts 100 to vary the portion of the weight carried by the compression springs 97.

The invention above described thus provides a novel apparatus for cleaning and burnishing the surfaces of conveyor rolls removed from a lehr, and for maintaining the temperature thereof so that they can be immediately reinstalled in the lehr.

It is to be understood that the form of the invention herewith shown and described is to be taken as an illustrative embodiment only of the same and that various changes in the shape, size and arrangement of parts may be resorted to without departing from the spirit of the invention.

I claim:

1. A cleaning apparatus for removing uneven and crusty deposits from and burnishing the cylindrical surfaces of conveyor rolls used in supporting and conveying a ribbon of glass in a direction transverse to the axis of the rolls, said apparatus comprising
   (a) an elongated main supporting unit adapted to rotatably support at least one conveyor roll;
   (b) means affixed to said main unit for rotatably supporting said one conveyor roll;
   (c) an elongated cleaning unit removably mounted on said main unit above said conveyor roll;
   (d) a carriage movably mounted on said cleaning unit and adapted to travel along the length of and over said conveyor roll;
   (e) means mounted on said cleaning unit for reciprocably moving said carriage along the length thereof;
   (f) a brush wheel mounted on said carriage adapted to be rotatably driven and positioned so as to contact the surface of said conveyor roll along the length thereof;
   (g) means for adjusting the pressure with which said brush wheel bears against said conveyor roll; and
   (h) a motor affixed on said mounting means for rotatably driving said brush wheel.

2. A cleaning apparatus for removing uneven and crusty deposits from and burnishing the cylindrical surfaces of conveyor rolls as claimed in claim 1, including means for maintaining the temperature of said one conveyor roll at a sufficient level whereat surface encrustations on said conveyor roll can better be removed and it can be immediately reinstalled in a lehr.

3. A cleaning apparatus for removing uneven and crusty deposits from and burnishing the cylindrical surfaces of conveyor rolls as claimed in claim 2, wherein said temperature maintaining means comprises a manifold pipe affixed to said main frame, and a plurality of burners mounted on and spaced longitudinally along said manifold pipe and directed toward said one conveyor roll.

4. A cleaning apparatus for removing uneven and crusty deposits from and burnishing the cylindrical surfaces of conveyor rolls as claimed in claim 1, wherein said rotatable roll supporting means comprises a pair of longitudinally spaced-apart rotary stations affixed to said main unit adjacent the ends thereof.

5. A cleaning apparatus for removing uneven and crusty deposits from and burnishing the cylindrical surfaces of conveyor rolls as claimed in claim 4, wherein each said rotary station comprises a large diameter center wheel flanked on either side by smaller diameter idler wheels.

6. A cleaning apparatus for removing uneven and crusty deposits from and burnishing the cylindrical surfaces of conveyor rolls as claimed in claim 5, including means for rotatably driving said center wheel of one of said stations.

7. A cleaning apparatus for removing uneven and crusty deposits from and burnishing the cylindrical surfaces of conveyor rolls as claimed in claim 1, wherein said unit includes a pair of elongated cylindrical rails affixed thereto and said carriage includes a rectangular plate spanning said rails and having similarly shaped shoes depending from the corners of said plate and slidably engaging said rails for reciprocating movement therealong.

8. A cleaning apparatus for removing uneven and crusty deposits from and burnishing the cylindrical surfaces of conveyor rolls as claimed in claim 1, wherein said means for reciprocally moving said carriage comprises an elongated drive screw rotatably mounted on said unit, a reversible motor for rotatably driving said drive screw, and means for detachably connecting said carriage to said drive screw.

9. A cleaning apparatus for removing uneven and crusty deposits from and burnishing the cylindrical surfaces of conveyor rolls as claimed in claim 8, wherein said means for reciprocably moving said carriage along said unit includes a pair of longitudinally spaced split nuts affixed to said carriage and threadably engaging said drive screw.

10. A cleaning apparatus for removing uneven and crusty deposits from and burnishing the cylindrical surfaces of conveyor rolls as claimed in claim 1, wherein said means for adjusting the spacing between said brush wheel and the conveyor roll comprises a plate hingedly connected to and depending from said carriage, said motor for rotatably driving said brush wheel being fixedly mounted on said hinged plate, and a pair of studs attached to said plate movably securing said hinged plate to said carriage.

* * * * *